United States Patent
Mitani

(10) Patent No.: US 12,476,442 B2
(45) Date of Patent: Nov. 18, 2025

(54) ELECTRICAL CONNECTION BOX

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Kenichi Mitani, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 334 days.

(21) Appl. No.: 18/031,146

(22) PCT Filed: Oct. 15, 2021

(86) PCT No.: PCT/JP2021/038318
§ 371 (c)(1),
(2) Date: Apr. 10, 2023

(87) PCT Pub. No.: WO2022/085600
PCT Pub. Date: Apr. 28, 2022

(65) Prior Publication Data
US 2024/0030689 A1    Jan. 25, 2024

(30) Foreign Application Priority Data
Oct. 21, 2020 (JP) ................ 2020-176649

(51) Int. Cl.
| | | |
|---|---|---|
| H02G 3/08 | (2006.01) |
| B60R 16/033 | (2006.01) |
| H01R 13/6581 | (2011.01) |
| H01R 13/68 | (2011.01) |

(52) U.S. Cl.
CPC ......... *H02G 3/081* (2013.01); *H01R 13/6581* (2013.01); *H01R 13/68* (2013.01); *B60R 16/033* (2013.01); *H01R 2201/26* (2013.01)

(58) Field of Classification Search
CPC ...... B60R 16/0238; B60R 16/02; Y02E 10/50
See application file for complete search history.

(56) References Cited

U.S. PATENT DOCUMENTS

2003/0070830 A1* 4/2003 Kondo ............... H01B 7/009
                                                              174/68.1
2018/0334113 A1  11/2018 Saito et al.
2019/0118739 A1   4/2019 Takamatsu et al.

FOREIGN PATENT DOCUMENTS

| JP | H03-094020 U1 | 9/1991 | |
|---|---|---|---|
| JP | 3006656 B2 * | 2/2000 | ............ B60K 35/00 |
| JP | 2002-044835 A | 2/2002 | |

(Continued)

OTHER PUBLICATIONS

International Search Report issued on Dec. 14, 2021 for WO 2022/085600 A1 (4 pages).

*Primary Examiner* — Jean F Duverne
(74) *Attorney, Agent, or Firm* — Venjuris, P.C.

(57) ABSTRACT

An electrical connection box (1) including: a metal casing (10); a positive busbar (30) housed in the casing (10); and a negative busbar (20) housed in the casing (10), and formed so as to surround the positive busbar (30).

6 Claims, 10 Drawing Sheets

(56) References Cited

FOREIGN PATENT DOCUMENTS

| JP | 2005-033882 A | 2/2005 |
|----|---------------|--------|
| JP | 2013-226019 A | 10/2013 |
| JP | 2014-212608 A | 11/2014 |
| JP | 2015-091154 A | 5/2015 |

* cited by examiner

ELECTRICAL CONNECTION BOX

CROSS REFERENCE TO RELATED APPLICATIONS

This application is a national phase of PCT application No. PCT/JP2021/038318, filed on 15 Oct. 2021, which claims priority from Japanese patent application No. 2020-176649, filed on 21 Oct. 2020, all of which are incorporated herein by reference.

TECHNICAL FIELD

The present invention relates to an electrical connection box.

BACKGROUND

Conventionally, as disclosed in Patent Documents 1 and 2, an electrical connection box such as a junction box is provided in a vehicle such as an automobile. Electric wires that are connected to a battery and various electrical components provided on a vehicle body are connected to the electrical connection box. Also, as disclosed in Patent Document 3, an electrical connection box (junction box, etc.) provided with a high-voltage circuit to which high-voltage electric wires are connected is provided in a vehicle such as an electric car. High-voltage electric wires connected to a battery and various types of electrical components provided on the vehicle body are connected to the electrical connection box.

PRIOR ART DOCUMENT

Patent Documents

Patent Document 1: JP 2002-044835 A
Patent Document 2: JP 2005-033882 A
Patent Document 3: JP 2014-212608 A

SUMMARY OF THE INVENTION

Problem to be Solved

Coincidentally, an electrical connection box to which high-voltage electric wires are connected as described above requires, for example, a metal casing that serves as a measure against electromagnetic noise that is based on high voltages, which leaves room for improvement regarding a reduction in size.

It is an object of the present disclosure to provide an electrical connection box that can be reduced in size.

Means to Solve the Problem

An electrical connection box according to the present disclosure including: a metal casing; a positive busbar housed in the casing; and a negative busbar housed in the casing, and formed so as to surround the positive busbar.

Effects of the Invention

With the present disclosure, it is possible to provide an electrical connection box that can be reduced in size.

DETAILED DESCRIPTION TO EXECUTE THE INVENTION

Description of Embodiments of Disclosure

Figure 1:
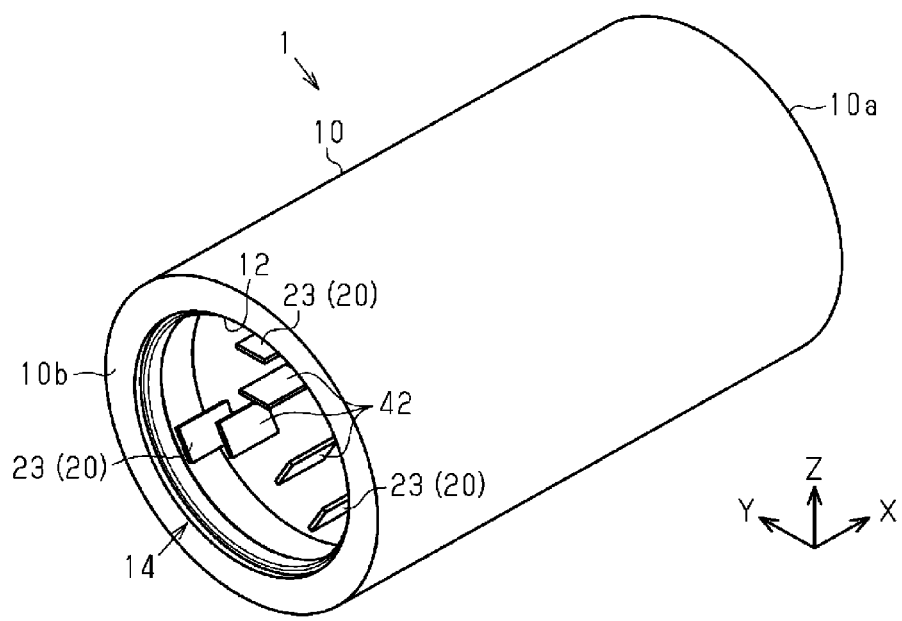
FIG. 1 is a perspective view of an electrical connection box according to the first embodiment.

First, embodiments of the present disclosure will be listed and described.

(1) An electrical connection box including: a metal casing; a positive busbar housed in the casing; and a negative busbar housed in the casing, and formed so as to surround the positive busbar.

With this configuration, the negative busbar surrounding the positive busbar and the metal casing serve to block out noise, and thus the metal casing can be made thinner, and the size of the electrical connection box can be reduced.

(2) It is preferable that the electrical connection box includes at least three fuses that are surrounded by the negative busbar, wherein each of the fuses has a columnar main body portion, each of the fuses are disposed such that the main body portion of the fuse extends along a first direction, and at least one of the three fuses is arrayed in a second direction that intersects the first direction, relative to at least one of the two remaining fuses, and is arrayed in a third direction that intersects the first direction and the second direction, relative to at least the other of the two remaining fuses.

With this configuration, the fuses can be disposed in a highly dense manner, and the size of the electrical connection box can be reduced.

(3) It is preferable that each fuse includes a first male tab provided on a first end surface of the main body portion, and a fixing tab provided on a second end surface of the main body portion, and the first male tab of the fuse has the same potential as the positive busbar.

With this configuration, portions that have the same potential as the positive busbar are surrounded by the negative busbar, and exposure to noise is suppressed.

(4) It is preferable that the fixing tabs of the fuses are electrically connected to the positive busbar.

With this configuration, the first male tab of each fuse can have the same potential as the positive busbar.

(5) It is preferable that the negative busbar includes second male tabs disposed respectively opposing the first male tabs of the fuses.

With this configuration, each first male tab and second male tab disposed opposing each other form a pair and constitute a connection terminal, and thus a device can be connected directly or via an electric wire to the electrical connection box.

(6) It is preferable that the positive busbar has a positive connection tab, and the negative busbar has a negative connection tab disposed opposing the positive connection tab.

With this configuration, the positive connection tab and the negative connection tab disposed opposing each other form a pair and constitute a connection terminal, and thus a device can be connected directly or via an electric wire to the electrical connection box.

Detailed Description of Embodiments of Disclosure

Specific examples of an electrical connection box according to the present disclosure will be described below with reference to the drawings. Parts of structures may be exaggerated or simplified in the drawings for ease of description. Also, dimensional ratios of parts may differ between drawings. The terms "parallel" and "orthogonal" as used in the present specification do not only include being exactly parallel and orthogonal but also include being substantially parallel and orthogonal within a range in which the operation and effects according to the embodiment are achieved. Note that the present invention is not limited to these examples, but is indicated by the claims, and all changes that come within the meaning and range of equivalency of the claims are intended to be embraced therein.

First Embodiment

The first embodiment is described below according to FIGS. 1 to 7.

Figure 2:
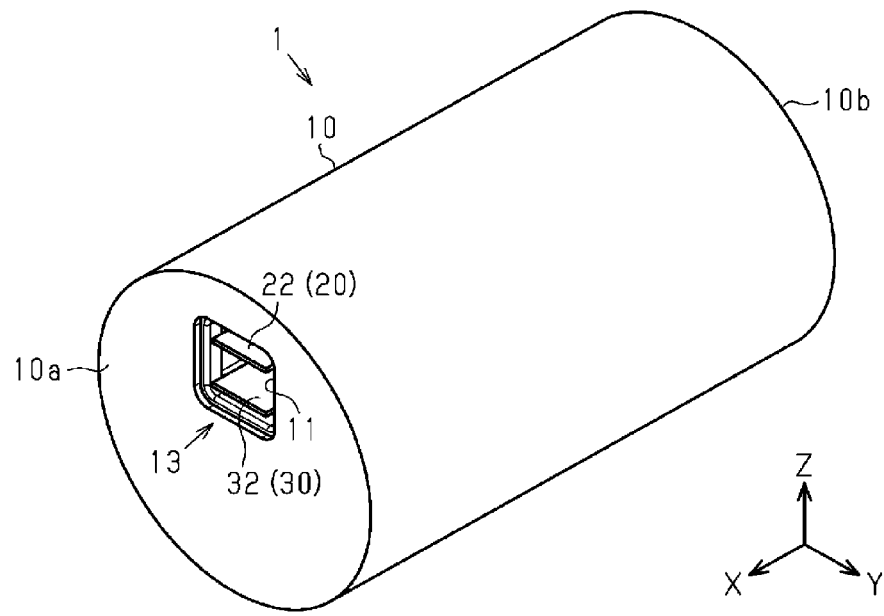
FIG. 2 is a perspective view of the electrical connection box according to the first embodiment.

As shown in FIGS. 1 and 2, an electrical connection box 1 of the present embodiment has a columnar casing 10. The casing 10 is made of metal. The casing 10 has a circular first end surface 10a and a circular second end surface 10b. In the present embodiment, the direction in which the first end surface 10a faces is the X direction, one direction extending in a radial direction of the circular first end surface 10a is the Y direction, and a direction that is orthogonal to the X and Y directions is the Z direction. The casing 10 of the present embodiment has a columnar shape whose central axis extends in the X direction.

The first end surface 10a of the casing 10 is provided with a first connection recessed portion 11. The electrical connection box 1 has a first external terminal 13 (first connection terminal) that is provided inside the first connection recessed portion 11. The first external terminal 13 includes a positive connection tab 32 and a negative connection tab 22.

The second end surface 10b of the casing 10 is provided with a second connection recessed portion 12. The electrical connection box 1 has a second external terminal 14 (second connection terminal) that is provided inside the second connection recessed portion 12. The second external terminal 14 includes a plurality of first male tabs 42 and second male tabs 23. In the present embodiment, the second external terminal 14 includes three pairs of first male tabs 42 and second male tabs 23.

Figure 7:
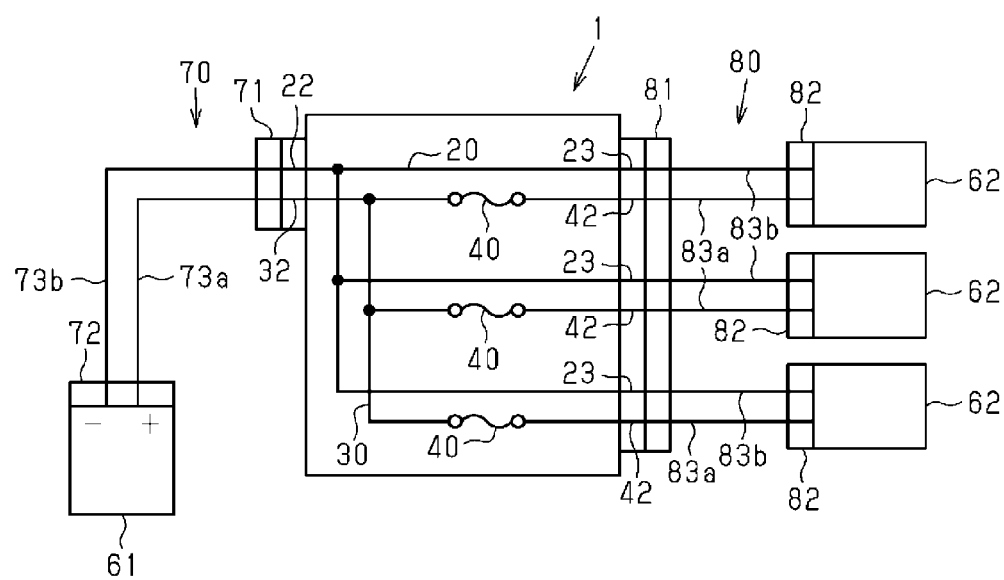
FIG. 7 is a block circuit diagram showing connection of the electrical connection box according to the first embodiment.

A connector 71 shown in FIG. 7 is to be inserted into the first connection recessed portion 11. The connector 71 is provided on a wire harness 70 that connects the electrical connection box 1 and a device 61 to each other. The wire harness 70 includes the connector 71, a connector 72 that is connected to the device 61, and electric wires 73a and 73b that are connected between the connector 71 and the connector 72.

The device 61 is an electrical device that is provided in a vehicle, and is a battery pack or a charging/discharging controller connected to a battery pack, for example. The device 61 is provided with positive and negative terminals, and the electric wires 73a and 73b are respectively connected to the positive and negative terminals. The positive connection tab 32 and the negative connection tab 22 of the first external terminal 13 of the electrical connection box 1 are correspondingly connected to the positive and negative terminals of the device 61 via the electric wires 73a and 73b of the wire harness 70.

A connector 81 shown in FIG. 7 is to be inserted into the second connection recessed portion 12 on the second end surface 10b shown in FIG. 1.

As shown in FIG. 7, a connector 81 is provided on a wire harness 80 that connects the electrical connection box 1 and plurality of devices 62 to each other. The wire harness 80 includes the connector 81, connectors 82 that are respectively connected to the devices 62, and electric wires 83a and 83b that are connected between the connector 81 and the connectors 82.

The device 62 is an electrical device provided in the vehicle, and is a motor, a unit for driving a motor, a voltage converter, or a low-voltage battery unit, for example. The device 62 is provided with a positive terminal and a negative terminal, and the positive terminal and the negative terminal are connected to a first male tab 42 and a second male tab 23 constituting the second external terminal 14 of the electrical connection box 1, via the electric wires 83a and 83b of the wire harness 80.

As shown in FIGS. 3 to 6, the electrical connection box 1 includes a negative busbar 20, a positive busbar 30, and a plurality (three in the present embodiment) of fuses 40, which are housed in the casing 10.

Figure 6:
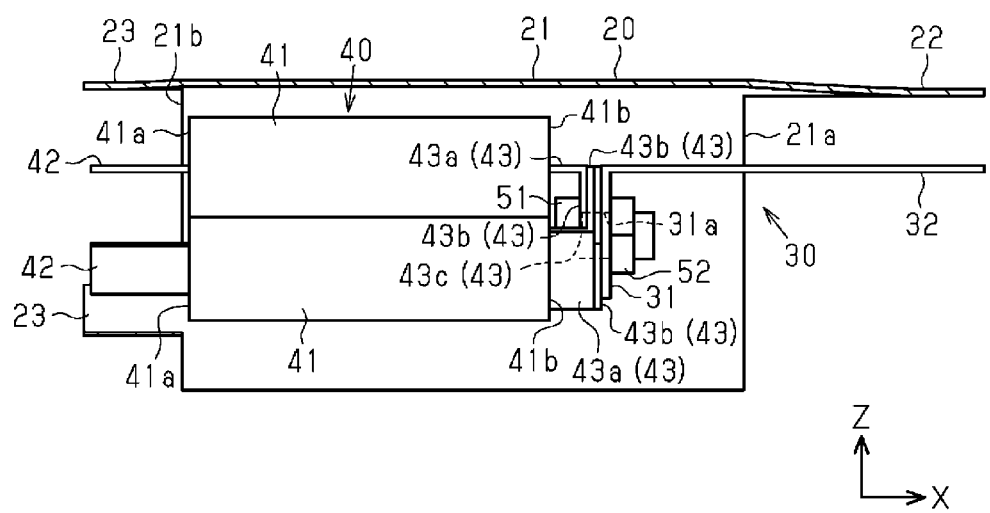
FIG. 6 is a side view showing a busbar and a fuse.

As shown in FIG. 6, each fuse 40 includes a main body portion 41, a first male tab 42, and a fixing tab 43. The main body portion 41 is columnar and has a first end surface 41a and a second end surface 41b. The first male tab 42 is formed protruding from the first end surface 41a of the main body portion 41. The fixing tab 43 is formed protruding from the second end surface 41b of the main body portion 41. The fixing tab 43 has an extension portion 43a that extends from the main body portion 41, and a connection portion 43b that extends from the leading end of the extension portion 43a in a direction orthogonal to the extension portion 43a. The connection portion 43b is provided with a through hole 43c. A bolt 51 for fixing the fuse 40 is inserted into the through hole 43c. The fuses 40 of the present embodiment are coupled to each other by the bolt 51 and a nut 52.

The three fuses 40 are coupled to each other by one bolt 51 and one nut 52. These fuses 40 are arrayed three-dimensionally. Specifically, the fuses 40 are disposed at equal angle intervals along the circumferential direction of a circle centered around the bolt 51. In other words, the three fuses 40 are disposed on three sides (three vertices) of an equilateral triangle centered about the bolt 51. Specifically, the three fuses 40 are arrayed in a direction extending along one side of an equilateral triangle and a direction extending along a different side. In this way, by arranging the three fuses 40 three-dimensionally, the density of the fuses 40 can be increased, the area occupied by the three fuses 40 can be reduced, and the size of the electrical connection box 1 can be reduced, compared to a case where the three fuses 40 are arranged in a line.

As shown in FIG. 6, the positive busbar 30 has a fixing portion 31 and a positive connection tab 32. The fixing portion 31 and the positive connection tab 32 extend orthogonal to each other. The fixing portion 31 and the positive connection tab 32 form the L shape of the positive busbar 30. The fixing portion 31 is provided with a through hole 31a. The bolt 51 for fixing the fuses 40 is inserted into the through hole 31a. That is, the fixing tabs 43 of the fuses 40 and the positive busbar 30 of the present embodiment are coupled to each other by the bolt 51 and the nut 52. Thus, the fixing tabs 43 of the fuses 40 have the same potential as the positive busbar 30. Furthermore, the first male tabs 42 of the fuses 40 have the same potential as the positive busbar 30.

The negative busbar 20 is formed so as to surround the positive busbar 30. Specifically, the negative busbar 20 is formed so as to surround the portions that have the same potential as the positive busbar 30. In other words, the negative busbar 20 is formed so as to enclose the positive busbar 30 and the fuses 40 connected to the positive busbar 30.

The negative busbar 20 is made of metal. The metal negative busbar 20 serves to prevent electromagnetic noise from reaching the positive busbar 30 and the fuses 40 enclosed by the negative busbar 20, that is, the negative busbar 20 serves to block out noise. The metal casing 10 that houses the negative busbar 20, the positive busbar 30, and the fuses 40 serves as a measure against electromagnetic noise, that is, serves to block out noise. In the electrical connection box 1 of the present embodiment, the metal casing 10 and the metal negative busbar 20 serve to block out noise. Thus, the metal casing 10 can be made thinner, and the size of the electrical connection box 1 can be reduced.

The negative busbar 20 of the present embodiment has a substantially cylindrical shape. For example, the negative busbar 20 is made to have a cylindrical shape by rolling up a flat metal plate.

The negative busbar 20 includes a main body portion 21, one negative connection tab 22, and three second male tabs 23.

The main body portion 21 has a cylindrical shape, and has a first end portion 21a on the first end surface 10a side of the casing 10 and a second end portion 21b on the second end surface 10b side of the casing 10. The negative connection tab 22 is formed so as to protrude from the first end portion 21a of the main body portion 21. The three second male tabs 23 are formed so as to protrude from the second end portion 21b of the main body portion 21. The three second male tabs 23 are disposed at equal angle intervals along a circumferential surface of the cylindrical main body portion 21. The second male tabs 23 are arranged opposing the first male tabs 42 of the fuses 40, respectively.

A positive connection tab 32 and a negative connection tab 22 form a pair, and function as a connection terminal to which the positive electric wire 73a and the negative electric wire 73b shown in FIG. 7 are connected. Also, a first male tab 42 and a second male tab 23 form a pair, and function as a connection terminal to which a positive electric wire 83a and a negative electric wire 83b shown in FIG. 7 are connected.

Operation and Effects

As described above, with the first embodiment, the following operation and effects are realized.

(1-1) The electrical connection box 1 is provided with the metal casing 10, the positive busbar 30 housed in the casing 10, and the negative busbar 20 that is housed in the casing 10 and formed so as to surround the positive busbar 30. The negative busbar 20 that surrounds the positive busbar 30 serves to block out noise along with the metal casing 10. Thus, due to the provision of the negative busbar 20 that surrounds the positive busbar 30, the metal casing 10 that houses the negative busbar 20 and the positive busbar 30 can be made thinner, and the size of the electrical connection box 1 can be reduced. By making the electrical connection box 1 smaller, it is possible to increase the installation freedom of the electrical connection box 1 in a vehicle in which it is to be mounted.

(1-2) The electrical connection box 1 is provided with three fuses 40 that are surrounded by the negative busbar. Each fuse 40 has a columnar main body portion 41, and the fuses 40 are arranged such that the main body portions 41 thereof extend along a first direction. One of the three fuses 40 is arrayed in a second direction that intersects a first direction, relative to one of the two remaining fuses 40, and is arrayed in a third direction that intersects the first direction and the second direction, relative to the other one of the two remaining fuses 40. Thus, the density of the fuses 40 can be increased, and the size of the electrical connection box can be reduced.

(1-3) Each fuse 40 has a first male tab 42 on the first end surface 41a of the main body portion 41, and a fixing tab 43 on the second end surface 41b of the main body portion 41, and the first male tab 42 has the same potential as the positive busbar 30. Portions that have the same potential as the positive busbar 30 are surrounded by the negative busbar 20, and exposure to noise can be suppressed.

(1-4) The fixing tabs 43 of the fuses 40 are electrically connected to the positive busbar 30. Thus, the first male tabs 42 of the fuses 40 can have the same potential as the positive busbar 30.

(1-5) The negative busbar 20 includes the second male tabs 23 that are disposed respectively opposing the first male tabs 42 of the fuses 40. The first male tabs 42 and the second male tabs 23 disposed opposing each other form pairs, and constitute the second external terminal 14, which can facilitate connection between the electrical connection box 1 and devices 62.

(1-6) The positive busbar 30 has the positive connection tab 32, and the negative busbar 20 has the negative connection tab 22 that is disposed opposing the positive connection tab 32. With this configuration, the positive connection tab 32 and the negative connection tab 22 disposed opposing each other form a pair and constitute the first external terminal 13, which can facilitate connection between the electrical connection box 1 and the device 61.

Second Embodiment

The second embodiment is described below with reference to FIGS. 8 to 14.

Note that, in this embodiment, constituent members that are in common with those in the above embodiment are given the same reference signs and description thereof is omitted.

Figure 8:
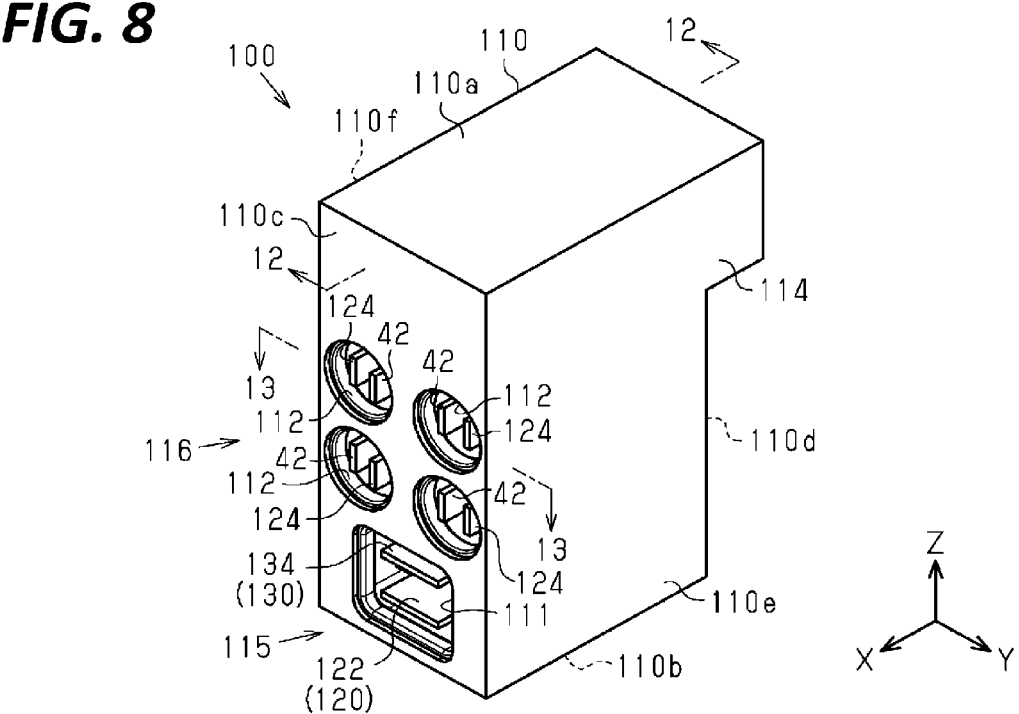
FIG. 8 is a perspective view of an electrical connection box according to a second embodiment.
Figure 9:
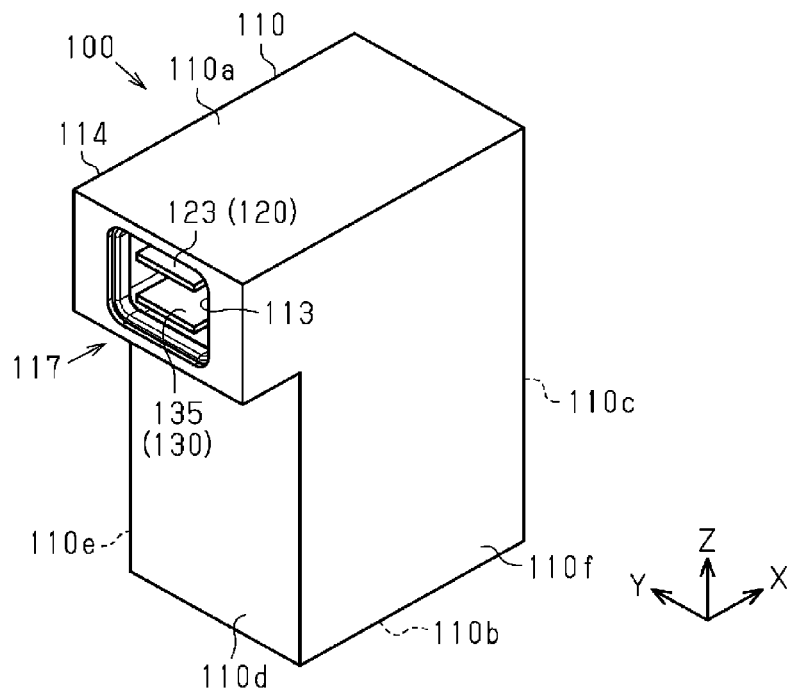
FIG. 9 is a perspective view of the electrical connection box according to the second embodiment.

As shown in FIGS. 8 and 9, an electrical connection box 100 according to the present embodiment has a substantially parallelopiped casing 110. The casing 110 is made of metal. The casing 110 has an upper surface 110a, a lower surface 110b, and a first side surface 110c to a fourth side surface 110f. The upper surface 110a and the lower surface 110b face opposite sides to each other in the Z direction, which is the height direction. The first side surface 110c and the second side surface 110d face opposite sides to each other in the X direction that is orthogonal to the Z direction. The third side surface 110e and the fourth side surface 110f face opposite sides to each other in the Y direction that is orthogonal to the Z and X directions.

The first side surface 110c is provided with a first connection recessed portion 111 and a plurality (four in the present embodiment) of second connection recessed portions 112. The second side surface 110d is provided with a third connection recessed portion 113. The third connection recessed portion 113 is provided toward the upper surface 110a of the casing 110. The casing 110 has a protruding portion 114 that protrudes from the second side surface 110d, and the third connection recessed portion 113 is provided in the protruding portion 114.

The electrical connection box 100 is provided with a first external terminal 115 (first connection terminal) that is provided inside the first connection recessed portion 111. The first external terminal 115 is constituted by a positive connection tab 134 and a negative connection tab 122.

Also, the electrical connection box 100 includes second external terminals 116 (second connection terminals) respectively provided in the second connection recessed portions 112. Each second external terminal 116 is constituted by a first male tab 42 and a second male tab 124.

Also, the electrical connection box 100 is provided with a third external terminal 117 (third connection terminal) that is provided in the third connection recessed portion 113. The third external terminal 117 is constituted by a positive connection tab 135 and a negative connection tab 123.

Figure 14:
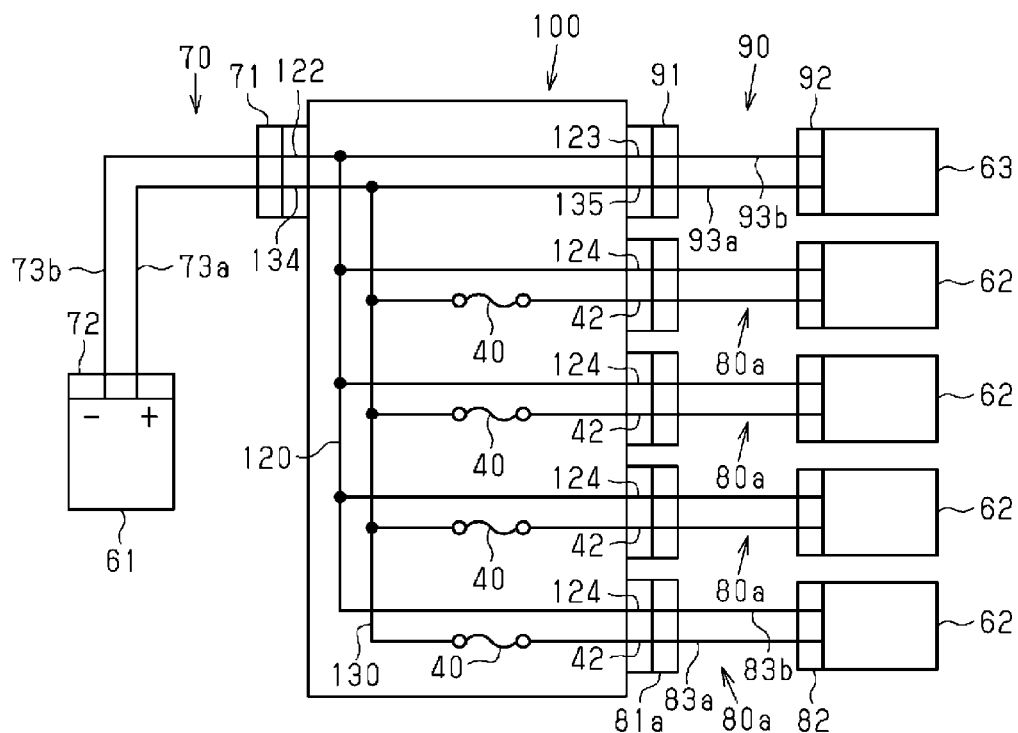
FIG. 14 is a block circuit diagram showing connection of the electrical connection box according to the second embodiment.

The connector 71 shown in FIG. 14 is to be inserted into the first connection recessed portion 111. The connector 71 is provided on the wire harness 70 for connecting the electrical connection box 100 and the device 61 to each other. The wire harness 70 includes the connector 71, the connector 72 that is connected to the device 61, and the electric wires 73a and 73b that connect between the connector 71 and the connector 72.

The device 61 is an electrical device that is provided in a vehicle, and is a battery pack or a charge/discharge controller connected to a battery pack, for example. The device 61 is provided with a positive terminal and a negative terminal, and the positive and negative terminals are respectively connected to the electric wires 73a and 73b. The positive connection tab 134 and the negative connection tab 122 of the first external terminal 115 of the electrical connection box 100 are respectively connected to the positive and negative terminals of the device 61 via the electric wires 73a and 73b of the wire harness 70.

Connectors 81a shown in FIG. 14 are to be inserted into the second connection recessed portions 112, respectively. Each connector 81a is provided on a wire harness 80a that connects the electrical connection box 100 and a device 62 to each other. The wire harness 80a is provided with the connector 81a, a connector 82 that is connected to the device 62, and electric wires 83a and 83b that are connected between the connector 81a and the connector 82.

The device 62 is an electrical device provided in the vehicle, and is a motor, a unit for driving a motor, a voltage converter, or a low-voltage battery unit, for example. The device 62 is provided with a positive terminal and a negative terminal, and the positive terminal and the negative terminal are connected to a second external terminal 116 of the electrical connection box 100 via the electric wires 83a and 83b of the wire harness 80a.

A connector 91 shown in FIG. 14 is to be inserted into the third connection recessed portion 113. The connector 91 is provided on a wire harness 90 that connects the electrical connection box 100 and a device 63 to each other. The wire harness 90 includes the connector 91, a connector 92 that is connected to the device 63, and electric wires 93a and 93b that are connected between the connector 91 and the connector 92.

The device 63 is an electrical device that is provided in a vehicle, and is a charging port for charging a battery pack, for example. The device 63 is provided with a positive terminal and a negative terminal, and the positive and negative terminals are respectively connected to the electric wires 93a and 93b. The positive connection tab 135 and the negative connection tab 123 of the third external terminal 117 of the electrical connection box 100 are respectively connected to the positive and negative terminals of the device 63 via the electric wires 93a and 93b of the wire harness 90.

As shown in FIGS. 10 to 13, the electrical connection box 100 is provided with a negative busbar 120, a positive busbar 130, and a plurality (four in the present embodiment) of fuses 40, which are housed in the casing 110.

Two fuses 40 disposed toward the upper surface 110a of the casing 110 are coupled to each other by a bolt 51 and a nut 52, and the fixing tabs 43 of these two fuses 40 are fixed to the positive busbar 130. Similarly, two fuses 40 disposed toward the lower surface 110b of the casing 110 are coupled to each other by a bolt 53 and a nut 54, and the fixing tabs 43 of these two fuses 40 are fixed to the positive busbar 130. Thus, the fuses 40 are arranged three-dimensionally. Note that the four fuses 40 may be fixed to the positive busbar 130 by one set of a bolt and nut. By arranging the four fuses 40 three-dimensionally in this way, the density of the fuses 40 can be increased, the area occupied by the four fuses 40 can be reduced, and the size of the electrical connection box 100 can be reduced, compared to a case where the four fuses 40 are arranged in a line.

Figure 10:
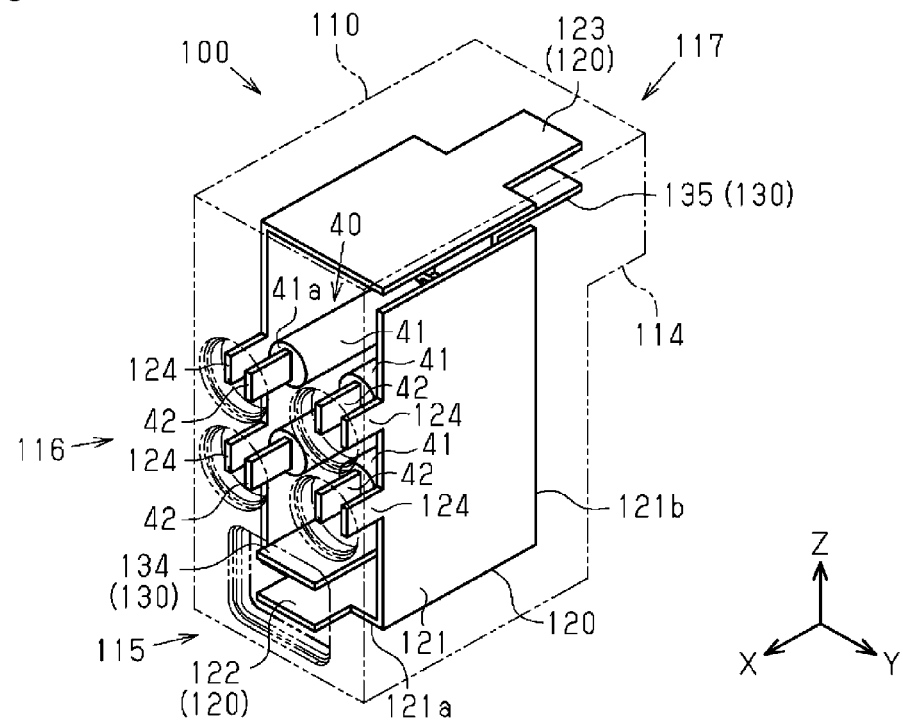
FIG. 10 is a perspective view showing an internal configuration of the electrical connection box according to the second embodiment.
Figure 11:
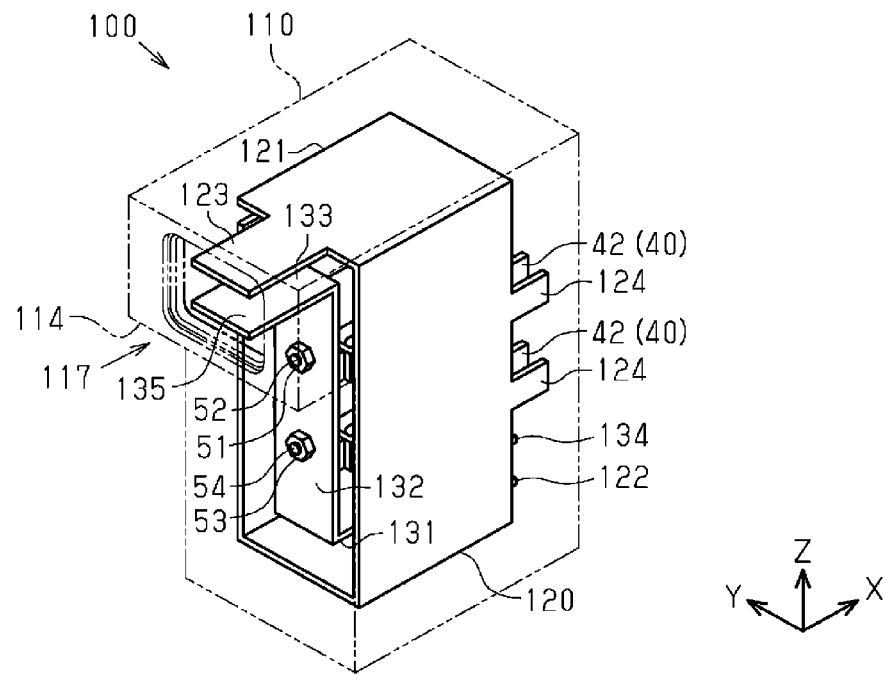
FIG. 11 is a perspective view showing an internal configuration of the electrical connection box according to the second embodiment.
Figure 12:
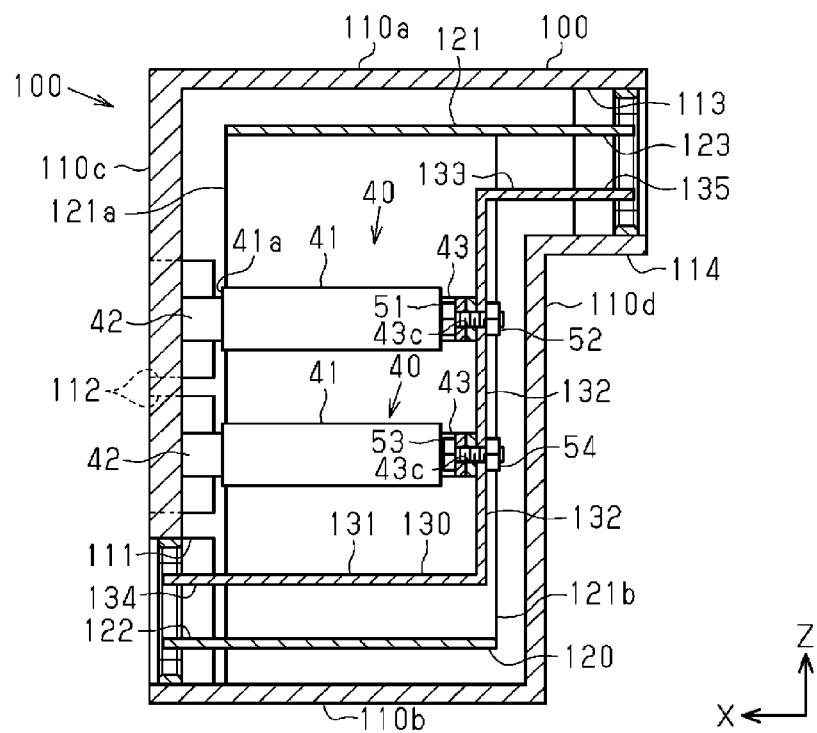
FIG. 12 is a cross-sectional view taken along line 12-12 in FIG. 8.

As shown in FIGS. 10, 11, and 12, the positive busbar 130 includes a first portion 131 that extends in the X direction along the bottom surface 110b of the casing 110, a second portion 132 that extends from the first portion 131 in the Z direction along the second side surface 110d of the casing 110, and a third portion 133 that extends in the X direction from the second portion 132. The fuses 40 are fixed to the second portion 132 extending in the Z direction. In the present embodiment, the fuses 40 are arrayed in the Y and Z directions. The positive busbar 130 includes a positive connection tab 134 at the leading end of the first portion 131, and a positive connection tab 135 at the leading end of the third portion 133.

The negative busbar 120 is formed so as to surround the positive busbar 130. Specifically, the negative busbar 120 is formed so as to surround portions that have the same potential as the positive busbar 130. In other words, the negative busbar 120 is formed so as to surround the positive busbar 130 and the fuses 40 connected to the positive busbar 130.

The negative busbar 120 is made of metal. The metal negative busbar 120 serves to prevent electromagnetic noise from reaching the positive busbar 130 and the fuses 40 surrounded by the negative busbar 120, that is, the negative busbar 120 serves to block out noise. The metal casing 110 that houses the negative busbar 120, the positive busbar 130, and the fuses 40 acts as a measure against electromagnetic noise, that is, serves to block out noise. In the electrical connection box 100 of the present embodiment, the metal casing 110 and the metal negative busbar 120 serve to block out noise. Thus, the metal casing 110 can be made thinner, and the size of the electrical connection box 100 can be reduced.

The negative busbar 120 of the present embodiment has a quadrangular tubular shape. For example, the negative busbar 120 is made to have a quadrangular tubular shape by folding a flat metal plate.

The negative busbar 120 is provided with a main body portion 121, two negative connection tabs 122 and 123, and four second male tabs 124.

The main body portion 121 has a quadrangular tubular shape, and has a first end portion 121a on the first side surface 110c side of the casing 110 and a second end portion 121b on the second side surface 110d side of the casing 110. The negative connection tab 122 and the four second male tabs 124 are formed so as to protrude from the first end portion 121a of the main body portion 121. The negative connection tab 123 is formed so as to protrude from the second end portion 121b of the main body portion 121. The negative connection tabs 122 and 123 are disposed correspondingly opposing the positive connection tabs 134 and 135 of the positive busbar 130. The second male tabs 124 are disposed respectively opposing the first male tabs 42 of the fuses 40.

The positive connection tab 134 and the negative connection tab 122 form a pair, and function as the first external terminal 115 to which the positive electric wire 73a and the negative electric wire 73b shown in FIG. 14 are connected. The positive connection tab 135 and the negative connection tab 123 form a pair, and function as a third external terminal 117 to which the positive electric wire 93a and the negative electric wire 93b shown in FIG. 14 are connected. Also, a first male tab 42 and a second male tab 124 form a pair, and function as a second external terminal 116 to which a positive electric wire 83a and a negative electric wire 83b shown in FIG. 14 are connected.

Operation and Effects

As described above, the following operation and effects are realized by the present embodiment.

(2-1) The electrical connection box 100 is provided with the metal casing 110, the positive busbar 130 housed in the casing 110, and the negative busbar 120 that is housed in the casing 110 and formed so as to surround the positive busbar 130. The negative busbar 120 that surrounds the positive busbar 130 serves to block out noise along with the metal casing 110. Thus, due to the provision of the negative busbar 120 that surrounds the positive busbar 130, the metal casing 110 that houses the negative busbar 120 and the positive busbar 130 can be made thinner, and the size of the electrical connection box 100 can be reduced. By making the electrical connection box 100 smaller, it is possible to increase the installation freedom of the electrical connection box 100 in a vehicle in which it is to be mounted.

(2-2) The electrical connection box 100 includes four fuses 40 that are surrounded by the negative busbar. Each fuse 40 includes a columnar main body portion 41, and the fuses 40 are disposed such that the main body portion 41 extends along the first direction. One of the four fuses 40 is arrayed in a second direction that intersects a first direction relative to one of the three remaining fuses 40, and is arrayed in a third direction that intersects the first direction and the second direction relative to another one of the three remaining fuses 40. Thus, the density of the fuses 40 can be increased, and the size of the electrical connection box can be reduced.

(2-3) The fuses 40 each include a first male tab 42 on the first end surface 41a of the main body portion 41, and a fixing tab 43 on the second end surface 41b of the main body portion 41, and the first male tab 42 has the same potential as the positive busbar 130. Portions that have the same potential as the positive busbar 130 are surrounded by the negative busbar 120, and exposure to noise can be suppressed.

(2-4) The fixing tabs 43 of the fuses 40 are electrically connected to the positive busbar 130. Thus, the first male tabs 42 of the fuses 40 can have the same potential as the positive busbar 130.

(2-5) The negative busbar 120 includes the second male tabs 124 that are disposed correspondingly opposing the first male tabs 42 of the fuses 40. A first male tab 42 and a second male tab 124 disposed opposing each other form a pair, and constitute a second external terminal 116, which can facilitate connection between the electrical connection box 100 and the devices 62.

(2-6) The positive busbar 130 includes the positive connection tab 134, and the negative busbar 120 includes the negative connection tab 122 that is disposed opposing the positive connection tab 134. With this configuration, the positive connection tab 134 and the negative connection tab 122 disposed opposing each other form a pair, and constitute the first external terminal 115, which can facilitate connection between the electrical connection box 100 and the device 61.

(2-7) The positive busbar 130 includes the positive connection tab 135, and the negative busbar 120 includes the negative connection tab 123 that is disposed opposing the positive connection tab 135. With this configuration, the positive connection tab 135 and the negative connection tab 123 disposed opposing each other form a pair, and constitute the third external terminal 117, which can facilitate connection between the electrical connection box 100 and the device 63.

MODIFIED EXAMPLES

The above embodiment can be implemented with the following modifications. The present embodiment and the following modified examples can be implemented in combination with each other, provided no technical contradiction arises.

Figure 15:
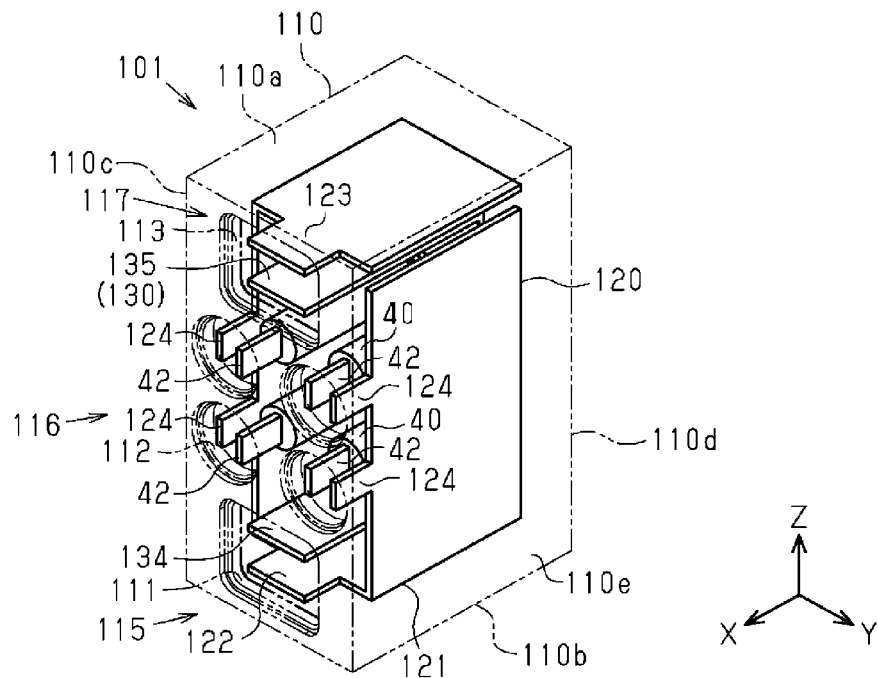
FIG. 15 is a perspective view showing an internal configuration of an electrical connection box according to a modified example.

As shown in FIG. 15, in an electrical connection box 101, the third connection recessed portion 113 is provided on the first side surface 110c of the casing 110. Nothing protrudes from and nothing is connected to the second side surface 110d of the casing 110 of this electrical connection box 101, and thus, for example, it is possible to increase the freedom with which other components can be disposed on the second side surface 110d side.

Figure 16:
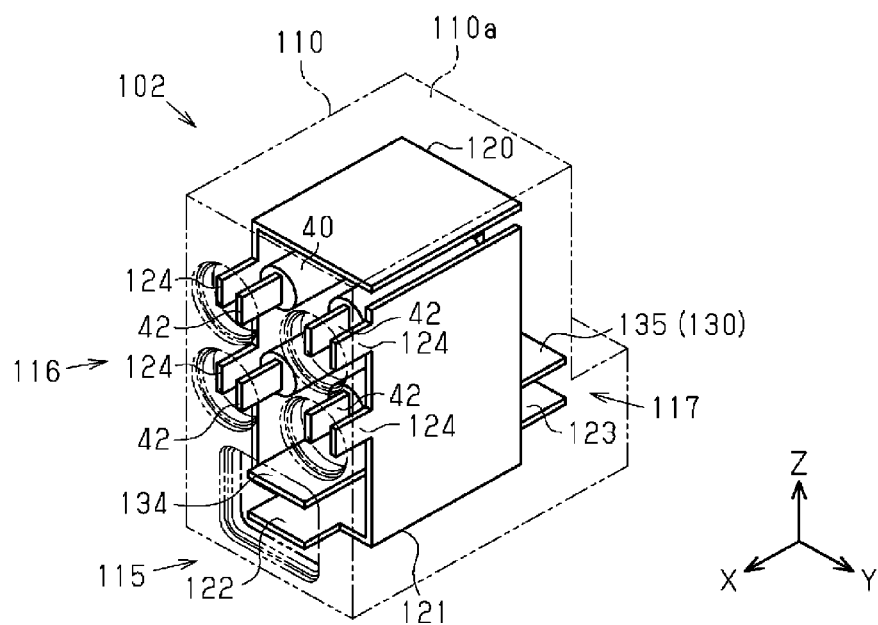
FIG. 16 is a perspective view showing an internal configuration of an electrical connection box according to a modified example.
Figure 17:
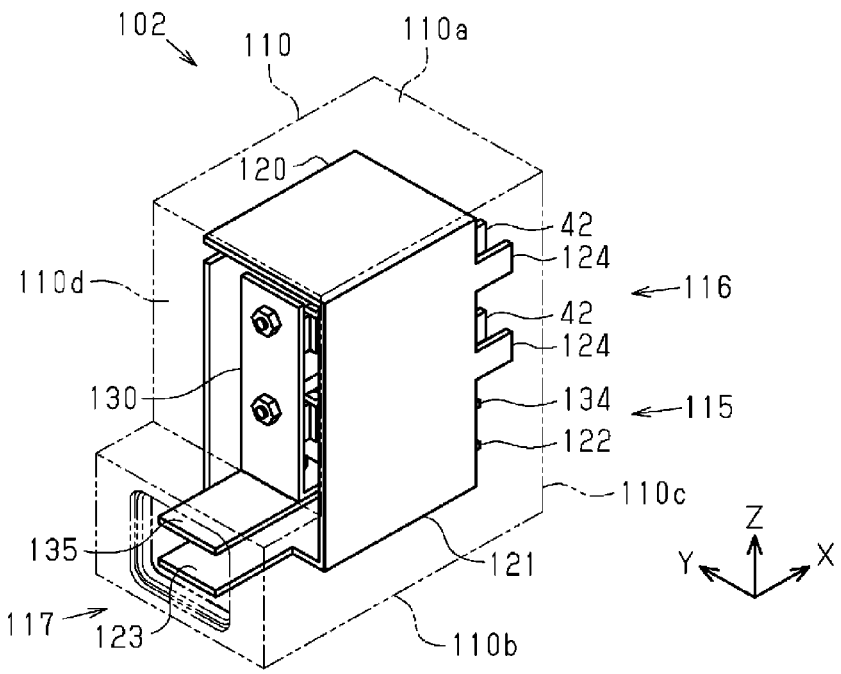
FIG. 17 is a perspective view showing an internal configuration of an electrical connection box according to a modified example.

As shown in FIGS. 16 and 17, in an electrical connection box 102, the third connection recessed portion 113 is provided toward the lower surface 110b side of the casing 110. The height of this electrical connection box 102 can be reduced.

Figure 18:
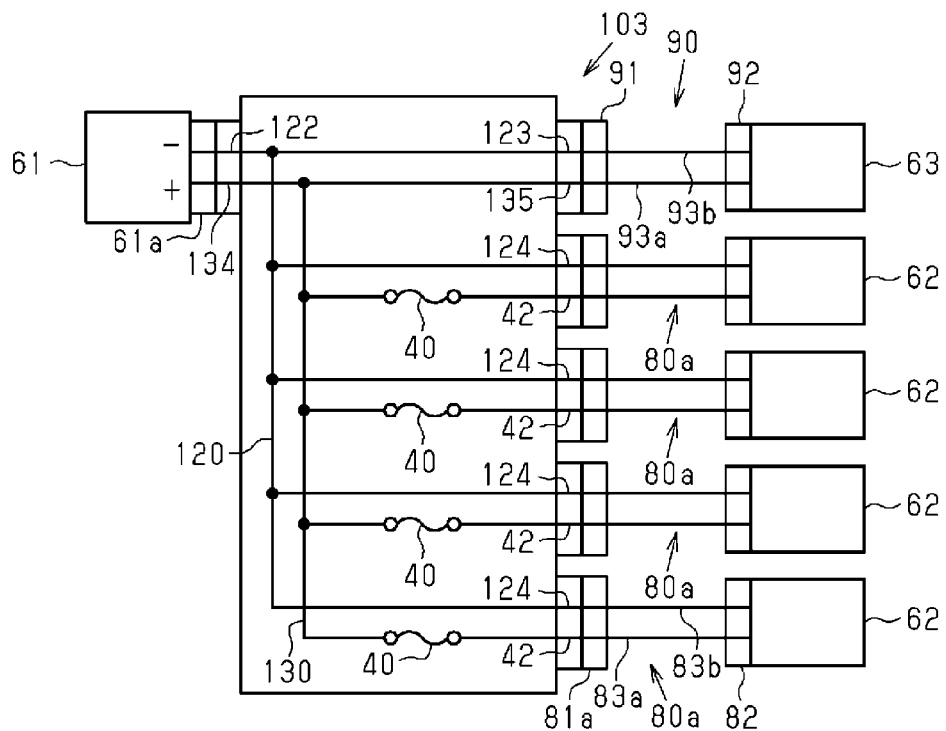
FIG. 18 is a block circuit diagram showing connection of an electrical connection box according to a modified example.

As shown in FIG. 18, an electrical connection box 103 is configured to be directly connected to the device 61 provided in the vehicle. For example, the positive connection tab 134 and the negative connection tab 122 of the electrical connection box 103 are directly connected to the terminals of a connector 61a of the device 61. The electrical connection box 103 is fixed to the casing of the device 61, for example. By employing this configuration, the device 61 and the electrical connection box 103 can be easily connected to each other.

Figure 19:
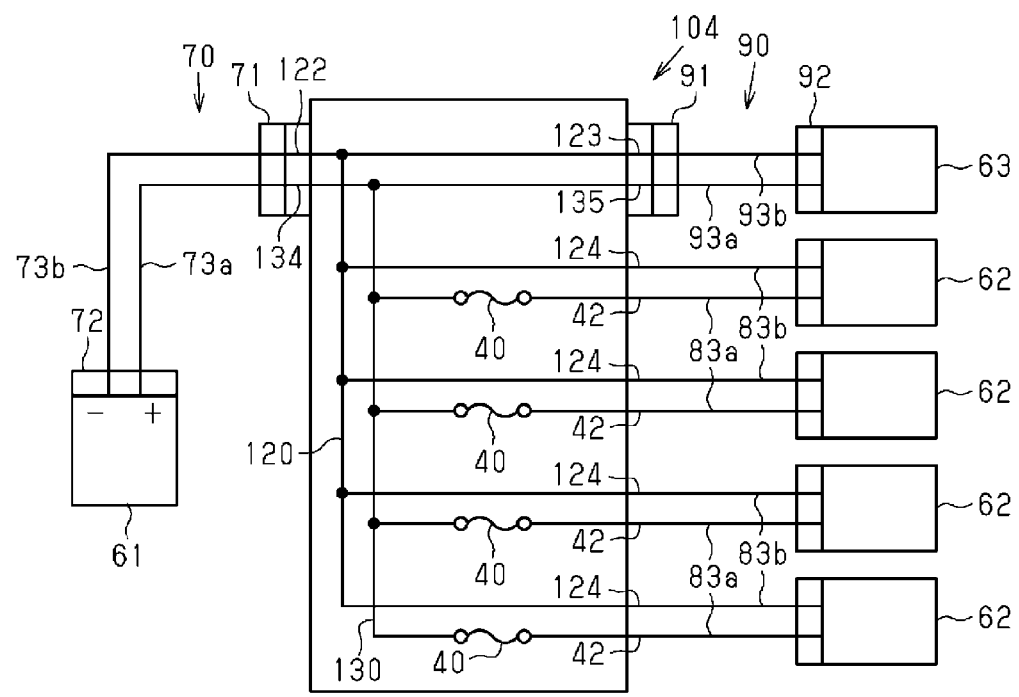
FIG. 19 is a block circuit diagram showing connection of an electrical connection box according to a modified example.

As shown in FIG. 19, positive electric wires 83a and negative electric wires 83b for connecting the devices 62 are correspondingly directly connected to the fuses 40 and the negative busbar 120 of the electrical connection box 104. By employing this configuration, the work involved in connecting wire harnesses 80a to the electrical connection box 104 when attaching the electrical connection box 104 to a vehicle or the like can be omitted. Note that, in the electrical connection box 104 shown in FIG. 19, at least one of the wire harnesses 70 and 90 connected to the devices 61 and 63 may be configured so as to be directly connected to the positive busbar 130 or the negative busbar 120. Also, at least one of the devices 62 may be configured so as to be connected using the wire harness 80a shown in FIG. 14.

In the above embodiments and the modified examples, the number of fuses may be changed appropriately. For example, the electrical connection box 1 of the first embodiment may be provided with four or more fuses. Also, the electrical connection box 100 of the second embodiment may be provided with three or five or more fuses.

In the first embodiment, the fixing tabs 43 of the fuses 40 and the positive busbar 30 are connected to each other by the bolt 51 and the nut 52, but the fixing tabs 43 and the positive busbar 30 may be connected to each other through welding or the like. Similarly, in the configuration illustrated in the second embodiment, the fixing tabs 43 of the fuses 40 and the positive busbar 130 may be connected to each other through welding or the like.

The disclosed embodiments and modified examples are illustrative in all regards and are not to be construed as limiting. The scope of the present invention is defined by the claims and not by the above description, and all changes that come within the meaning and range of equivalency of the claims are intended to be embraced therein.

As shown in FIGS. 1 and 2, the first external terminal 13 and the second external terminal 14 may face in opposite directions. As shown in FIGS. 8 and 9, the first external terminal 115 may face in the same direction as the second external terminals 116 while facing in the opposite direction to the third external terminal 117. As shown in FIG. 15, the first external terminal 115 may face in the same direction as the second external terminals 116 and the third external terminal 117.

Figure 3:
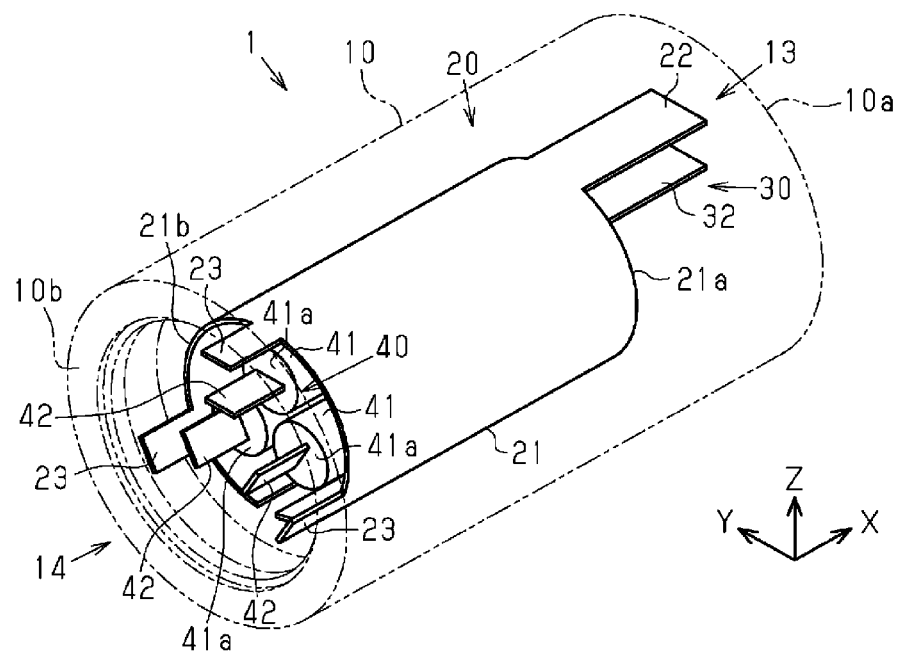
FIG. 3 is a perspective view showing an internal configuration of the electrical connection box according to the first embodiment.
Figure 4:
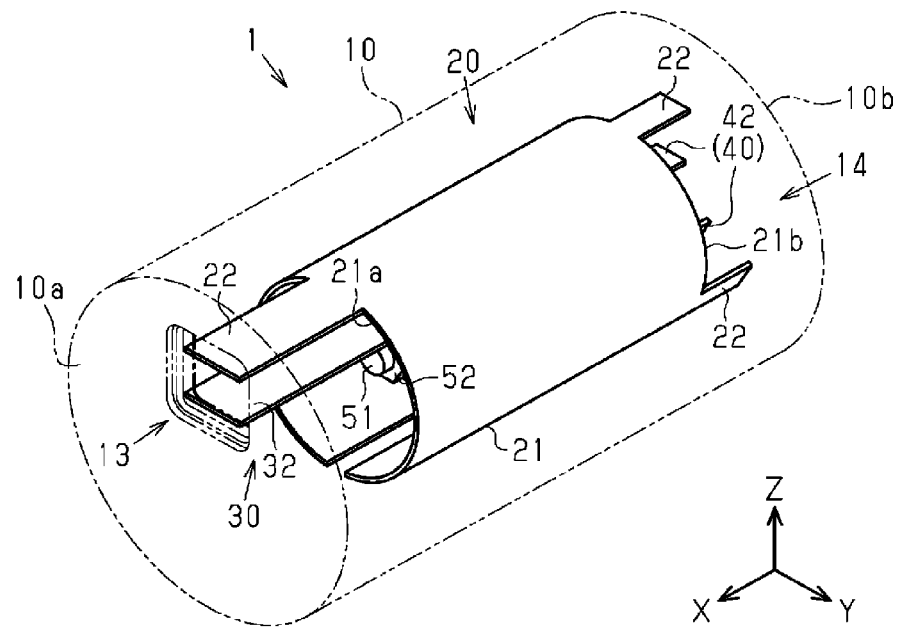
FIG. 4 is a perspective view showing an internal configuration of the electrical connection box according to the first embodiment.
Figure 5:
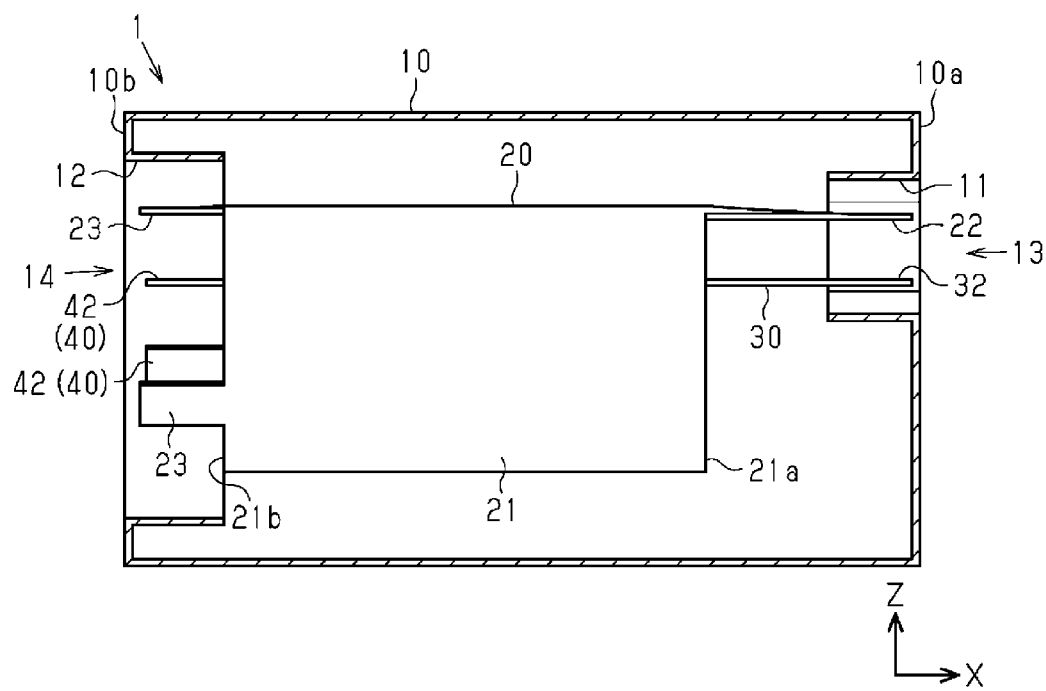
FIG. 5 is a cross-sectional view of the electrical connection box according to the first embodiment.

As shown in FIGS. 3 and 6, the main body portions 41 of the fuses 40 may be arrayed parallel to each other inside the negative busbar 20. The positions of the fuses 40 may coincide with each other along the axial direction of the main body portion 21 of the negative busbar 20. The axial length of the main body portions 41 of the fuses 40 may be shorter than the axial length of the main body portion 21 of the negative busbar 20, and the entirety of the main body portions 41 of the fuses 40 may be housed inside the main body portion 21 of the negative busbar 20. A portion of the positive busbar 30 may protrude past the main body portion 21 of the negative busbar 20.

Figure 13:
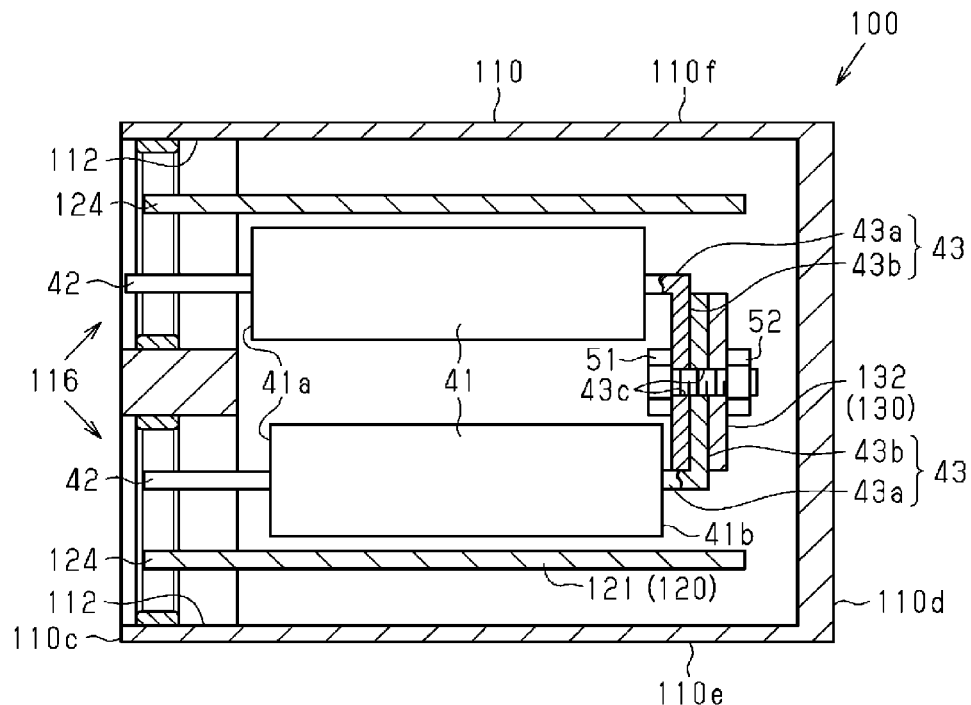
FIG. 13 is a cross-sectional view taken along line 13-13 in FIG. 8.

As shown in FIGS. 12 and 13, the main body portions 41 of the fuses 40 may be arrayed parallel to each other inside the negative busbar 120. As shown in FIG. 13, the positions of the fuses 40 may be shifted from each other along the axial direction of the main body portion 121 of the negative busbar 120. As shown in FIG. 12, a portion (first end surface 41a) of the main body portion 41 of each fuse 40 may protrude from the inside of the main body portion 121 of the negative busbar 20. The entirety of the second portion 132 of the positive busbar 130 may be housed in the main body portion 121 of the negative busbar 120, and the first portion 131 and a portion of the third portion 133 may protrude from the main body portion 121 of the negative busbar 120.

As shown in FIG. 3, the second male tab 23 of the negative busbar 20 may have a flat plate shape. The first male tabs 42 of the fuses 40 may have a flat plate shape. The fuses 40 may be arrayed such that the first male tabs 42 are arranged along a circle centered around the center of the main body portion 21 of the negative busbar 20. Each first male tab 42 may oppose the corresponding second male tab 23 in the radial direction of the main body portion 21 of the negative busbar 20.

As shown in FIG. 10, the second male tabs 124 of the negative busbar 120 may have a flat plate shape. The second male tabs 124 may be parallel to each other, and the fuses 40 may be arranged such that the first male tab 42 is parallel to the corresponding second male tab 124.

As shown in FIG. 6, the three fuses 40 may be connected to the positive busbar 30 by one set of a bolt 51 and a nut 52. As shown in FIGS. 12 and 13, two fuses may be connected to the positive busbar 130 by one set of a bolt 51 and a nut 52.

As shown in FIG. 3, the positive busbar 30 and the fuses 40 may be dually covered by the casing 10 and the negative busbar 20. As shown in FIG. 10, the positive busbar 130 and the fuses 40 may be dually covered by the casing 100 and the negative busbar 120.

As shown in FIG. 3, the fuses 40 may be fixed in a trefoil formation.

The first connection recessed portions 11 and 111 of the illustrated embodiments may be referred to as input ports configured such that the device 61, which may be a power source device, can be connected thereto. The second connection recessed portions 12 and 112 of the illustrated embodiments may be referred to as output ports configured such that the devices 62, which may be load devices, can be connected thereto. The positive connection tabs 32 and 134 of the illustrated embodiments may be referred to as positive input terminals. The negative connection tabs 22 and 122 of the illustrated embodiments may be referred to as negative input terminals. The casings 10 and 110 of the illustrated embodiments may be referred to as metal casings that have a tubular housing space that can be cylindrical or have a polygonal tubular shape. The main body portion 21 of the negative busbar 20 can be referred to as an intermediate tubular portion that can be cylindrical or have a polygonal tubular shape, and may form, in the tubular housing space of the casings 10 and 110, a tubular inner sub housing space for housing at least portions of the fuses 40.

The present disclosure encompasses the following implementation examples. Reference signs are given to several constituent elements of the exemplary embodiments not for limitation but to aid in comprehension. Some of the items described in the following implementation examples may be omitted, and several items of the implementation examples may be selected or extracted and combined.

[Supplementary Note 1]

In an aspect of the present disclosure, the axial length of the main body portion (41) of the fuse (40) may be smaller than the axial length of the main body portion (21) of the negative busbar (20), and the entirety of the main body portion (41) of the fuse (40) may be housed in the main body portion (21) of the negative busbar (20).

[Supplementary Note 2]

In an aspect of the present disclosure, a plurality of the fuses (40) may be connected to the positive busbar (30; 130) by one set of a bolt (51) and a nut (52).

[Supplementary Note 3]

An electrical connection box (1; 100; 101; 102; 103; 104) according to several aspects of the present disclosure may include:

a metal casing (10; 110);

a positive busbar (30; 130) housed in the casing (10; 110); and a negative busbar (20; 120) that is housed in the casing (10; 110) and is formed so as to dually cover the positive busbar (30; 130) in cooperation with the casing (10; 110).

[Supplementary Note 4]

In an aspect of the present disclosure, a plurality of fuses (40) connected to the positive busbar (30; 130) may be provided, wherein the fuses (40) may be arrayed three-dimensionally.

[Supplementary Note 5]

An electrical connection box (1; 100; 101; 102; 103; 104) according to several aspects of the present disclosure may include:

a metal casing (10; 110) that includes an input port (11) configured to be connected to a first device (61), which may be a power supply device, and an output port (12) configured to be connected to one or more second devices (62), which may be load devices;

an input terminal pair including a positive input terminal (32) and a negative input terminal (22), that are disposed in the input port (11) of the metal casing (10; 110);

one or more output terminal pairs that include a positive output terminal (42) and a negative output terminal (23), that are disposed in the output port (12) of the metal casing (10; 110); and a plurality of electrical components (30; 130, 20; 120, 40) housed in the metal casing (10; 110), wherein each of the electrical components may include:

a positive busbar (30; 130) including the positive input terminal (32) and a fixing portion (31), a fuse element (40) that includes a first electrode being the positive output terminal (42), a second electrode being a connection portion (43*b*) fixedly connected to the fixing portion (31) of the positive busbar (30; 130), and a fuse main body (41) between the positive output terminal (42) and the connection portion (43*b*), and a negative busbar (20; 120) that includes the negative input terminal (22), the negative output terminal (23), and an intermediate tubular portion (21) between the negative input terminal (22) and the negative output terminal (23), and the intermediate tubular portion (21) of the negative busbar (20; 120) may surround the connection portion (43*b*) of the fuse element (40) and the fuse main body (41).

[Supplementary Note 6]

In several aspects of the present disclosure, the metal casing (10; 110) may have a tubular housing space, which can be a cylindrical or polygonal tubular shape, for housing the electrical components, the intermediate tubular portion (21) of the negative busbar (20; 120) may be disposed in the tubular housing space of the metal casing (10; 110), and form a tubular inner sub housing space in the tubular housing space, and the fuse element (40) may be disposed in the tubular inner sub housing space of the intermediate tubular portion (21) of the negative busbar (20; 120), excluding the positive output terminal (42).

[Supplementary Note 7]

In several aspects of the present disclosure, an outer surface of the intermediate tubular portion (21) of the negative busbar (20; 120) and an inner surface of the metal casing (10; 110) may oppose each other across a gap therebetween.

[Supplementary Note 8]

In several aspects of the present disclosure, the tubular housing space of the metal casing (10; 110) and the tubular inner sub housing space of the intermediate tubular portion (21) of the negative busbar (20; 120) may be cylindrical in shape.

[Supplementary Note 9]

In several aspects of the present disclosure, the tubular housing space of the metal casing (10; 110) and the tubular inner sub housing space of the intermediate tubular portion (21) of the negative busbar (20; 120) may have a polygonal tubular shape.

[Supplementary Note 10]

In several aspects of the present disclosure, the one or more output terminal pairs (42, 23) of the output port (12) may be configured to be correspondingly connected to a plurality of second devices (62), and be a plurality of output terminal pairs each including a positive output terminal (42) and a negative output terminal (23), and the negative input terminal (22) of the output terminal pairs may be a portion of the negative busbar (20; 120).

LIST OF REFERENCE NUMERALS

1 Electrical connection box
10 Casing
20 Negative busbar
21 Main body portion
22 Negative connection tab
23 Second male tab
30 Positive busbar
32 Positive connection tab
40 Fuse
41 Main body portion
42 First male tab
43 Fixing tab
100-104 Electrical connection box
110 Casing
120 Negative busbar
121 Main body portion
122 Negative connection tab
123 Negative connection tab
124 Second male tab
130 Positive busbar
134 Positive connection tab
135 Positive connection tab

What is claimed is:

1. An electrical connection box comprising:
a metal casing;
a positive busbar housed in the casing, and including a positive connection tab;
a plurality of fuses housed in the casing, each including a first male tab having a potential the same as a potential of the positive bus bar; and
a negative busbar housed in the casing, formed so as to surround the positive busbar and the plurality of fuses, and including a negative connection tab opposing the positive connection tab and a plurality of second male tabs respectively opposing the first male tabs,
wherein the negative connection tab is disposed outwardly of the positive connection tab, and the second male tabs are disposed outwardly of the first male tabs, with respect to a center of the casing.

2. The electrical connection box according to claim 1,
wherein the plurality of fuses include at least three fuses that are surrounded by the negative busbar,
wherein each of the fuses has a columnar main body portion,
each of the fuses are disposed such that the main body portion of the fuse extends along a first direction, and
at least one of the three fuses is arrayed in a second direction that intersects the first direction, relative to at least one of the two remaining fuses, and is arrayed in a third direction that intersects the first direction and the second direction, relative to at least the other of the two remaining fuses.

3. The electrical connection box according to claim 2,
wherein each fuse includes the first male tab provided on a first end surface of the main body portion, and a fixing tab provided on a second end surface of the main body portion.

4. The electrical connection box according to claim 3,
wherein the fixing tabs of the fuses are electrically connected to the positive busbar.

5. The electrical connection box according to claim 1,
wherein each of the fuses includes a columnar first main body portion from which a corresponding first male tab protrudes,
the negative busbar includes a tubular second main body portion from which the negative connection tab and the second male tabs protrude, and
the second main body portion surrounds the first main body portions.

6. The electrical connection box according to claim 1,
wherein, in a plan view, an area of a virtual closed loop defined by connecting the first male tabs is less than an area of a virtual closed loop defined by connecting the second male tabs.

* * * * *